US006859625B2

(12) United States Patent
Sawada

(10) Patent No.: US 6,859,625 B2
(45) Date of Patent: Feb. 22, 2005

(54) IMAGE FORMING DEVICE HAVING A REGULAR INFORMATION DISPATCH JUDGMENT UNIT CONFIGURED TO DETERMINE IRREGULAR MESSAGE TRANSMISSION

(75) Inventor: Masaichi Sawada, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 288 days.

(21) Appl. No.: 10/106,346

(22) Filed: Mar. 27, 2002

(65) Prior Publication Data

US 2002/0141763 A1 Oct. 3, 2002

(30) Foreign Application Priority Data

Mar. 29, 2001 (JP) ........................................ 2001-096562

(51) Int. Cl.⁷ ............................................. G03G 15/00
(52) U.S. Cl. .................................. 399/8; 399/9; 399/11
(58) Field of Search ............................ 399/8, 9, 11, 18

(56) References Cited

U.S. PATENT DOCUMENTS 5,677,775 A * 10/1997 Yamaguchi et al. ........ 358/468
5,913,090 A    6/1999 Sawada et al.
6,141,507 A    10/2000 Sawada \* cited by examiner Primary Examiner—Quana Grainger
(74) Attorney, Agent, or Firm—Oblon, Spivak, McClelland, Maier & Neustadt, P.C.

(57) ABSTRACT

In an image forming device, a first transmitting unit periodically transmits a regular message, indicating a state information of the device, to a central management equipment by connecting the device to the management equipment via a communication line when a timing of dispatch of the regular message is detected. A second transmitting unit transmits an irregular message, indicating a malfunction information of the device, to the management equipment by connecting the device to the management equipment via the communication line when a malfunction in the device is detected. A transmission judgment unit determines, immediately before the regular message transmission is started, whether the irregular message has been transmitted within a preset period prior to a timing of the regular message transmission, based on a stored newest malfunction information.

11 Claims, 3 Drawing Sheets

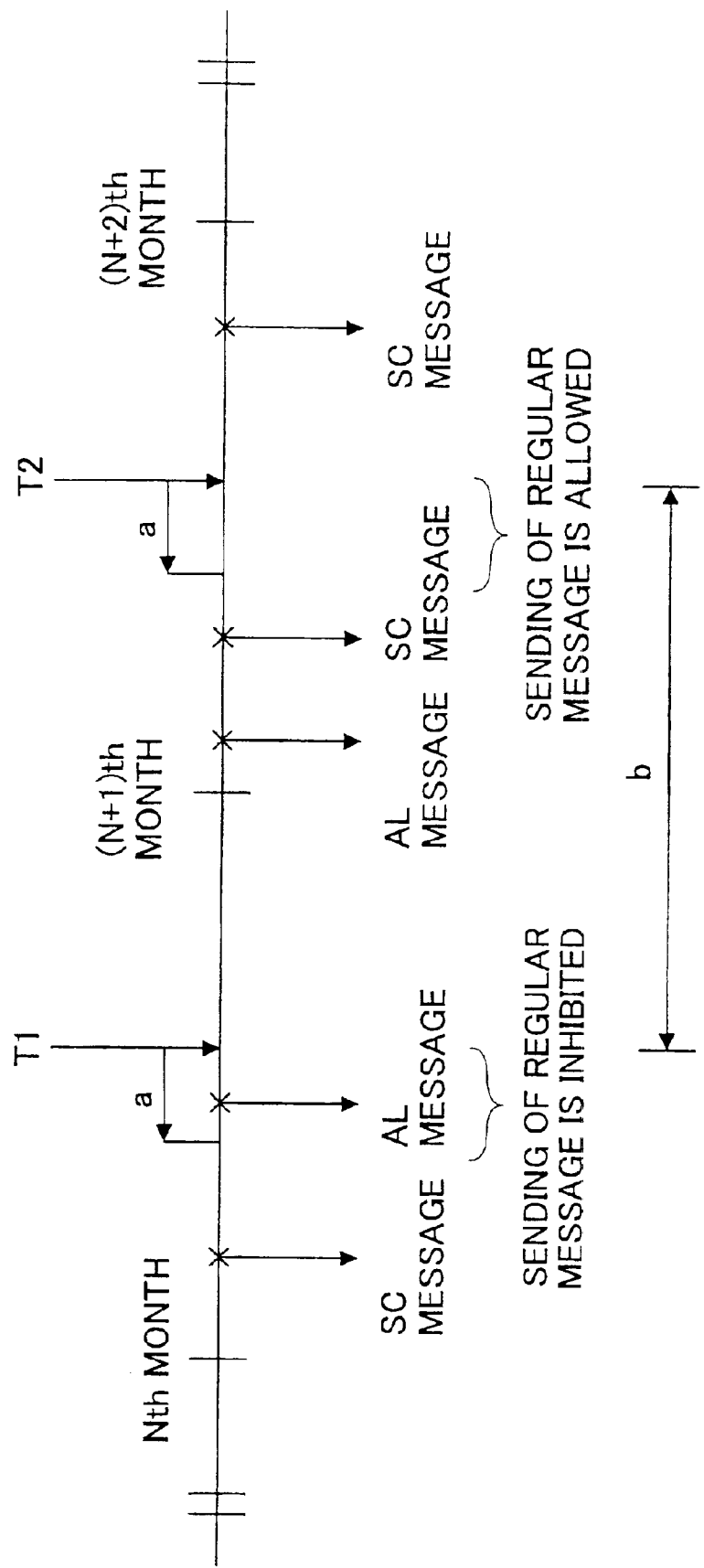

IMAGE FORMING DEVICE HAVING A REGULAR INFORMATION DISPATCH JUDGMENT UNIT CONFIGURED TO DETERMINE IRREGULAR MESSAGE TRANSMISSION

BACKGROUND OF THE INVENTION

1. Field of the Invention

The present invention generally relates to image forming devices, such as copiers, facsimiles and printers, and more particularly to an image forming device the maintenance of which can be remotely managed by a central management equipment by using a communication line.

2. Description of the Related Art

Image forming devices that perform image formation on paper by using an electro-photoconductive printing process are commonly known. The rate of occurrence of a malfunction in the mechanism that carries out the electro-photoconductive printing process is comparatively high. Moreover, there is the necessity for periodical inspection of the image forming devices for performance maintenance, and the service organization of the maintenance must be provided. For example, in order to perform a periodical use situation report and an operation quality check to the customer (user) who purchased an image forming device, it is necessary for the central management equipment to acquire periodically the state information which indicates the state of the image forming device.

For the purpose of efficient maintenance, the image forming device of a certain type is equipped with a communication device that is connectable with a central management equipment, installed at a remote service center, via a communication line, such as a telephone line (public line). The image forming device is periodically connected with the central management equipment through the communication line by using the communication device. By performing the communication, the image forming device periodically sends a regular message to the central management equipment. The state information is contained in the regular message, sent to the central management equipment via the communication line, and it indicates the operational states of the image forming device concerned (for example, the lapsed period from the time of installation of the device concerned, the total number of copy sheets used, the period of use of the device concerned, etc.).

Moreover, when a malfunction occurs, the image forming device is connected with the central management equipment through the communication line by using the communication device. By performing the communication in such situations, the image forming device sends an irregular message to the central management equipment. For example, the irregular message is sent to the central management equipment when a malfunction phenomenon (self-diagnostic abnormalities) or a preliminary malfunction phenomenon (prior warning) takes place in the image forming device. The malfunction information is contained in the irregular message, and it is notified to the central management equipment. The timing of an irregular message is not predictable.

However, with the use of the image forming devices which transmit the regular message and the irregular message, there is the case where the sending of such messages to the central management equipment is performed very frequently, and the amount of the messages or the traffic from the image forming devices to the central management equipment exceeds a permissible level. It may cause a trouble in the communication environment that is originally provided for the image forming devices. Moreover, it may cause a difficulty in performing the maintenance management of the image forming devices by the central management equipment.

SUMMARY OF THE INVENTION

An object of the present invention is to provide an improved image forming device in which the above-described problems are eliminated.

Another object of the present invention is to provide an image forming device that avoids the frequent transmission of messages to the central management equipment and allows the central management equipment to perform efficient maintenance of the image forming device.

The above-mentioned objects of the present invention are achieved by an image forming device which is equipped with a communication unit which connects the image forming device to a central management equipment via a communication line in order to allow the central management equipment to remotely perform maintenance of the image forming device, the image forming device comprising: a first transmitting unit which periodically transmits a regular message, indicating a state information of the device, to the management equipment by connecting the device to the management equipment via the communication line when a timing of dispatch of the regular message is detected; a second transmitting unit which transmits an irregular message, indicating a malfunction information of the device, to the management equipment by connecting the device to the management equipment via the communication line when a malfunction in the device is detected; and a transmission judgment unit which determines, immediately before the regular message transmission is started, whether the irregular message has been transmitted within a preset period prior to a timing of the regular message transmission, based on a stored newest malfunction information, the transmission judgment unit allowing the first transmitting unit to transmit the regular message only when it is determined that the irregular message has not been transmitted within the preset period.

According to the image forming device of the present invention, only when it is determined that the irregular message has not been transmitted within the preset period prior to the timing of the regular message transmission, the regular information dispatch judgment unit allows the regular information transmitting unit to transmit the regular message to the central management equipment. Hence, the image forming device of the present invention is effective in avoiding the frequent transmission of messages to the central management equipment, and this allows the central management equipment to perform efficient maintenance of the image forming device.

BRIEF DESCRIPTION OF THE DRAWINGS

Other objects, features and advantages of the present invention will be apparent from the following detailed description when read in conjunction with the accompanying drawings.

FIG. 3 is a diagram for explaining the timing of transmission of a regular message that is allowed or inhibited by the image forming device in FIG. 1.

DETAILED DESCRIPTION OF PREFERRED EMBODIMENTS

A description will now be provided of preferred embodiments of the present invention with reference to the accompanying drawings.

Figure 1:
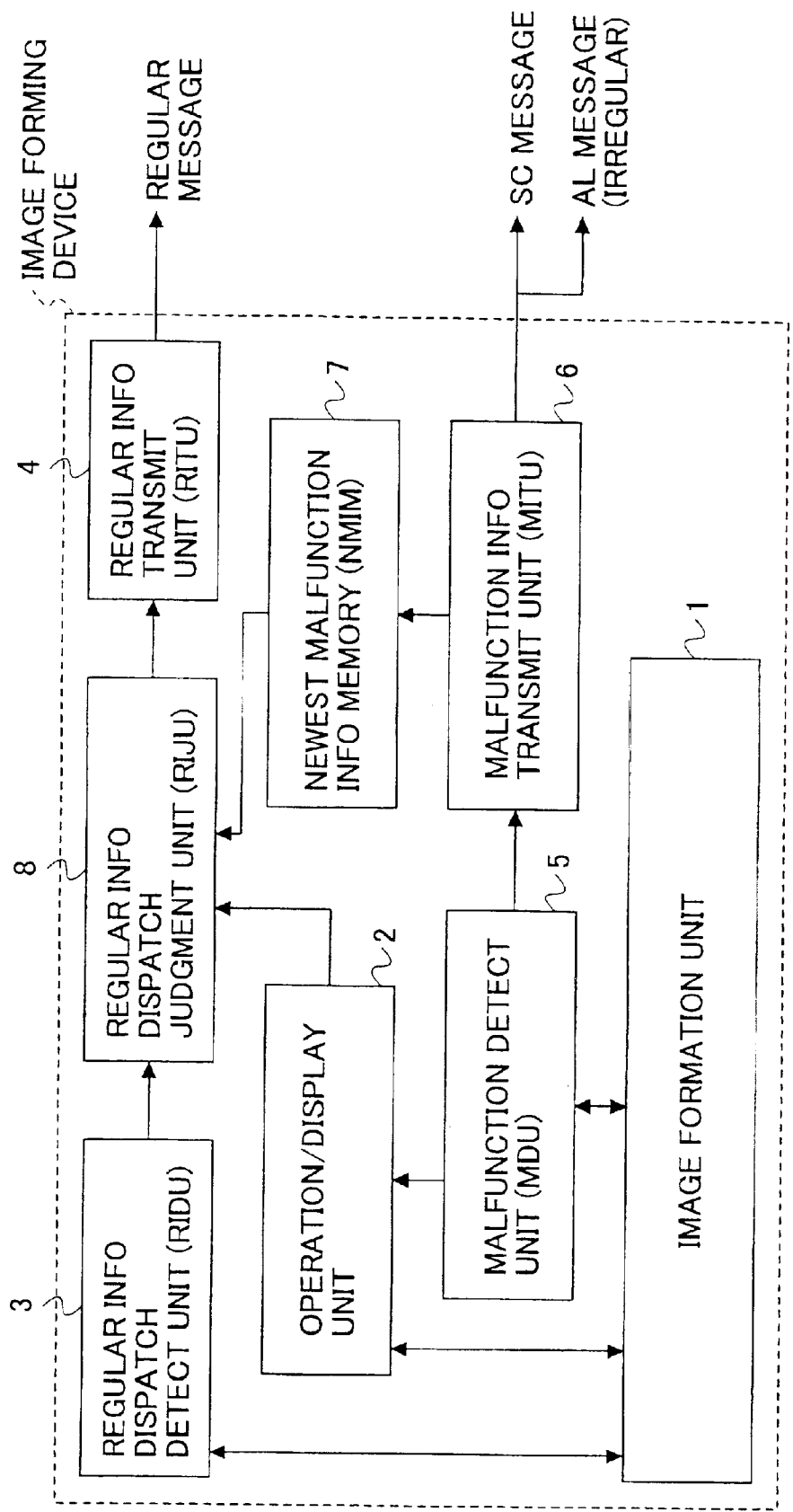
FIG. 1 is a block diagram of one preferred embodiment of the image forming device according to the present invention.

FIG. 1 shows one preferred embodiment of the image forming device of the present invention. As shown in FIG. 1, the image forming device generally includes an image formation unit 1, an operation/display unit 2, and a regular information dispatch detecting unit (RIDU) 3, a regular information transmitting unit (RITU) 4, a malfunction detecting unit (MDU) 5, a malfunction information transmitting unit (MITU) 6, a newest malfunction information memory (NMIM) 7, and a regular information dispatch judgment unit (RIJU) 8.

In the image forming device of the present embodiment, the regular information dispatch detecting unit (RIDU) 3, the regular information transmitting unit (RITU) 4, the malfunction detecting unit (MDU) 5, the malfunction information transmitting unit (MITU) 6, the newest malfunction information memory (NMIM) 7 and the regular information dispatch judgment unit (RIJU) 8 are constituted by means of a microprocessor (not shown) of the image forming device that includes a CPU (central processing unit), a program ROM (read-only memory) and a RAM (random access memory). Hereinafter, these elements of the image forming device will be called the RIDU 3, the RITU 4, the MDU 5, the MITU 6, the NMIM 7 and the RIJU 8, respectively, for the sake of simplicity of description.

In the image forming device in FIG. 1, the image formation unit 1 performs image formation on paper based on image data received from an external equipment (not shown), such as a personal computer, or based on image data received from a scanner unit (not shown) of the image forming device.

The operation/display unit 2 is a combined component that is constituted by an operation unit which inputs various information to the image forming device, and a display unit which displays various information in a visible manner to the operator.

The RIDU 3 detects the timing of dispatch of a regular message to the central management equipment. The regular message contains state information which indicates the states of the image forming device, including the lapsed period from the time of installation of the device concerned, the total number of copy sheets used, and the period of use of the device concerned. The RIDU 3 in the present embodiment detects the timing of dispatch of the regular message when one of the following events (1), (2) and (3) takes place in the image forming device.

(1) When a predetermined date and time of regular message transmission is reached, the RIDU 3 detects the timing of dispatch of a regular message and outputs a timing detection signal. For example, the transmission of a regular message occurs on a monthly basis or per several months.

(2) When the total number of copy sheets used exceeds a predetermined number related to the image forming device concerned, the RIDU 3 detects the timing of dispatch of a regular message and outputs a timing detection signal.

(3) When the period of use of the image forming device concerned exceeds a predetermined period, the RIDU 3 detects the timing of dispatch of a regular message and outputs a timing detection signal.

In addition, the image forming device of the present embodiment is configured such that the timing of dispatch of a regular message, which is detected by the RIDU 3, can be changed by inputting a dispatch timing change command from the operation/display unit 2.

The RITU 4 provides the functions of a communication device and a regular message transmitting device. When the timing of dispatch of a regular message is detected by the RIDU 3 and the transmission of the regular message to the central management equipment is allowed by the RIJU 8, the RITU 4 establishes a connection of the image forming device and the central management equipment via the communication line, and then transmits the regular information to the central management equipment through the communication line.

The MDU 5 detects a malfunction in the image forming device. When a malfunction phenomenon or a preliminary malfunction phenomenon occurs in the image formation unit 1 of the image forming device, the MDU 5 detects such malfunction, and outputs a malfunction detection signal to both the MITU 6 and the operation/display unit 2.

The MITU 6 provides the functions of a communication device and an irregular message transmitting device. When a malfunction phenomenon (self-diagnostic abnormality) in the image forming device is detected by the MDU 5, the MITU 6 establishes a connection of the image forming device and the central management equipment via the communication line, and then transmits the irregular information to the central management equipment through the communication line. The malfunction information contained in the irregular message is sent to the central management equipment. This irregular message is called a serviceman call (SC) message. Moreover, when a preliminary malfunction phenomenon (prior warning) in the image forming device is detected by the MDU 5, the MITU 6 establishes a connection of the image forming device and the central management equipment via the communication line, and then transmits the irregular information to the central management equipment through the communication line. The malfunction information contained in the irregular message is sent to the central management equipment. This irregular message is called an alarm (AL) message.

The NMIM 7 stores a newest malfunction information that is output by the MITU 6 as the result of the irregular message transmission. The newest malfunction information, stored in the NMIM 7, is a newest record of the transmitting history information (log) of the image forming device concerned. The newest record of the transmitting history information includes the results of the SC or AL message transmission (including the date and time of the newest irregular message transmission, the total number of copy sheets used, or the period of use of the image forming device concerned) as well as the results of the regular message transmission which is performed together with the irregular message transmission. Such newest malfunction information is stored in the NMIM 7.

The RIJU 8 provides the functions of a newest malfunction detecting device, a regular message transmission permitting device, a preset period changing device and a control operation inhibiting device. The RIJU 8 reads the newest malfunction information from the NMIM 7 and detects the date and time of the newest transmission of the irregular message contained in the read information. At the timing just before the transmission of the regular information is started by the RITU 4, the RIJU 8 determines whether an irregular message has been transmitted within a preset period prior to the timing of the regular information transmission, based on the newest malfunction information (or the newest record of the SC or AL message) stored in the NMIM 7. Only when it is determined that the irregular message has not been transmitted, the RIJU 8 allows the RITU 4 to transmit the regular information to the central management equipment through the communication line. Otherwise the RIJU 8 inhibits the transmission of the regular message by the RITU 4.

Moreover, when a preset period changing command is inputted from the operation/display unit 2, the RIJU 8 changes the preset period to an arbitrarily selected period in response to the input command. Moreover, when a control operation inhibiting command is inputted from the operation/display unit 2, the RIJU 8 cancels the above-described control operation that is performed at the timing before the transmission of the regular information is started by the RITU 4.

Figure 2:
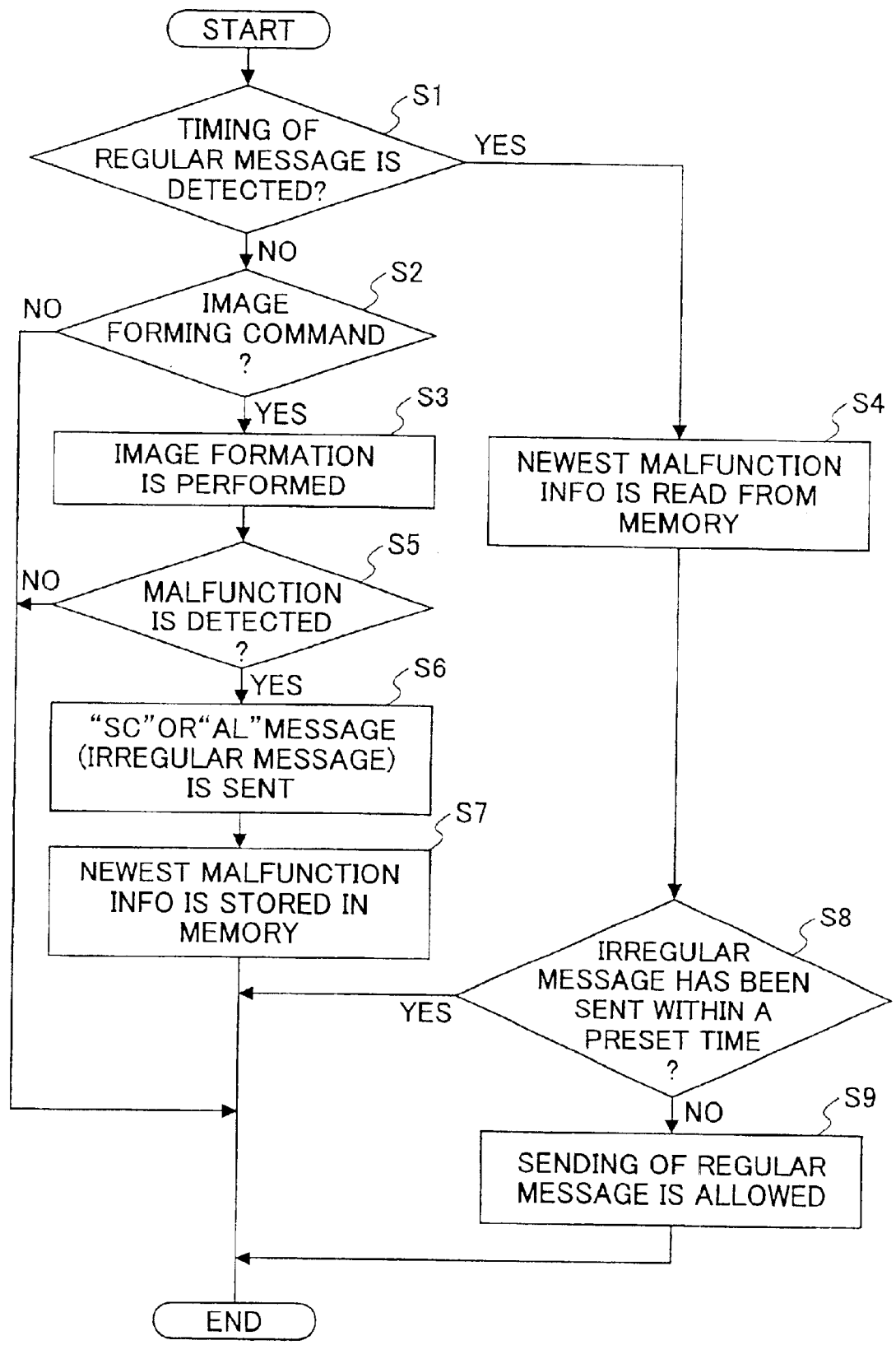
FIG. 2 is a flowchart for explaining a control operation executed by the image forming device in FIG. 1.

FIG. 2 shows a control operation that is executed by the image forming device in FIG. 1. The CPU of the image forming device of the present embodiment periodically starts the execution of the control operation in FIG. 2. Hereinafter, the CPU of the image forming device will be called the CPU, for the sake of simplicity of description.

At a start of the control operation in FIG. 2, the CPU determines whether the timing of dispatch of the regular message is detected by the RIDU 3 (S1). As described above, the RIDU 3 detects the timing of dispatch of the regular message when one of the above-mentioned events (1), (2) and (3) takes place in the image forming device. When the result at the step S1 is negative, the CPU determines whether an image formation start command for starting the image formation performed by the image formation unit 1 is received (S2).

When the result at the step S2 is affirmative, the CPU causes the image formation unit 1 to perform the image formation in response to the received image formation start command (S3). In a case where the received command in the step S2 is a print start command sent by the external equipment (not shown), the image formation unit 1 performs the image formation on paper based on image data received from the external equipment in the step S3. In a case where the received command in the step S2 is a copy start command sent by the operation/display unit 2, the image formation unit 1 performs the image formation on paper based on image data received from the scanner unit (not shown) of the image forming device in the step S3.

After the step S3 is performed, the CPU determines whether the MDU 5 has detected a malfunction (a malfunction phenomenon or a preliminary malfunction phenomenon) in the image formation unit 1 of the image forming device (S5). When the result at the step S5 is negative, there is no malfunction in the image forming device, and the control operation of FIG. 2 ends. On the other hand, when the result at the step S5 is affirmative, the CPU causes the MITU 6 to perform the transmission of the irregular message (the SC or AL message) to the central management equipment (S6). The MITU 6 in this step S6 establishes the connection of the image forming device and the central management equipment via the communication line, and then transmits the irregular message, together with the regular message, to the central management equipment through the communication line.

After the step S6 is performed (or an end-of-transmission signal is received), the CPU causes the newest malfunction information related to the MITU 6 to be stored into the NMIM 7 (S7). For example, the results of the irregular message transmission (including the date and time of the newest transmission of the irregular message, the total number of copy sheets used or the period of use of the device concerned) as well as the results of the regular message transmission are stored into the NMIM 7 in the step S7. After the step S7 is performed, the control operation of FIG. 2 ends.

On the other hand, when the result at the step S1 is affirmative, the timing of dispatch of the regular message is detected by the RIDU 3, and the CPU causes the RIJU 8 to read the newest malfunction information from the NMIM 7 (S4). At this timing, which is immediately before the transmission of the regular message is started by the RITU 4, the CPU causes the RIJU 8 to determine whether the irregular message has been transmitted within the preset period prior to that timing of the regular message transmission, based on the newest malfunction information read from the NMIM 7 (S8).

When the result at the step S8 is negative, it is determined that the irregular message has not been transmitted within the preset period. The CPU at this time causes the RIJU 8 to allow the RITU 6 to transmit the regular information to the central management equipment through the communication line (S9). After the step S9 is performed, the control operation of FIG. 2 ends.

When the result at the step S8 is affirmative, it is determined that the irregular message has been transmitted within the preset period. The CPU at this time does not cause the RIJU 8 to allow the regular message transmission. Then, the control operation of FIG. 2 ends. In other words, the RIJU 8 inhibits the transmission of the regular message by the RITU 6 at this timing.

In the image forming device of the present embodiment, the detection of the timing of dispatch of the regular message in the step S1 is performed by the RIDU 3 depending on whether one of the above-mentioned events (1), (2) and (3) or any combination of these events takes place.

FIG. 3 shows the timing of transmission of the regular message that is allowed or inhibited by the image forming device in FIG. 1.

In FIG. 3, "T1" and "T2" indicate the timing of dispatch of the regular message that is detected by the RIDU 3, and the arrow "a" indicates the preset period prior to the timing of the regular message transmission, and the arrow "b" indicates the interval between the timing T1 and the timing T2. Suppose that the image forming device of the present embodiment is configured such that the transmission of a regular message occurs on a monthly basis.

In the image forming device of the present embodiment, at the timing T1 or the timing T2, the RIJU 8 performs the above-described determination as to the occurrence of irregular message transmission in the step S8 of FIG. 2.

As shown in FIG. 3, if the RIJU 8 performs the above determination at the timing T1, the RIJU 8 inhibits the transmission of the regular message at the timing T1 as the result of the determination because the AL message has been transmitted within the present period "a" prior to the timing T1. If the RIJU 8 performs the above determination at the timing T2, the RIJU 8 allows the transmission of the regular message at the timing T2 because neither the AL message nor the SC message has been transmitted within the present period "a" prior to the timing T2.

Accordingly, in the image forming device of the present embodiment, at the timing just before the transmission of the regular information is started by the RITU 4, the RIJU 8 determines whether an irregular message has been transmitted within a preset period prior to the timing of the regular message transmission, based on the newest malfunction information (or the results of the newest SC or AL message transmission) stored in the NMIM 7. Only when it is determined that the irregular message has not been transmitted, the RIJU 8 allows the RITU 4 to transmit the regular information to the central management equipment through the communication line. Otherwise the RIJU 8 inhibits the transmission of the regular message by the RITU 4. Thus, the image forming device of the present embodiment is effective in avoiding the frequent transmission of messages to the central management equipment, and this allows the central management equipment to perform efficient maintenance of the image forming device.

Moreover, if the image forming device is configured such that the preset period can be changed according to the demand of the user, the image forming device makes it possible to safely prevent the occurrence of any trouble in the use environment of the image forming device, the user's communication environment, or the maintenance management of the image forming device by the central management equipment.

Furthermore, the maintenance management of the image forming device by the central management equipment can be ensured if the image forming device is configured such that the control operation executed by the regular information dispatch judgment unit 8 just before the start of transmission of the regular message can be canceled.

Moreover, in the above-described embodiments, when one of the three events: (1) the predetermined date and time is reached; (2) the total number of copy sheets used exceeds the predetermined number; and (3) the period of use of the image forming device exceeds the predetermined period, takes place in the image forming device, the regular information dispatch detecting unit 3 detects the timing of dispatch of the regular message. The regular information dispatch judgment unit 8 performs the control operation just before the timing of the regular message transmission. Alternatively, the regular information dispatch detecting unit 3 may detect the timing of dispatch of the regular message when any combination of the above three events take place or when a different event in the image forming device takes place.

Furthermore, the malfunction detecting unit 5 in the above-described embodiments can detect a malfunction phenomenon and a preliminary malfunction phenomenon in the image forming device. Alternatively, the malfunction detecting unit 5 may be configured to detect one of a malfunction phenomenon and a preliminary malfunction phenomenon. In such alternative embodiment, the regular information dispatch judgment unit 8 can perform the control operation in accordance with the detection by such malfunction detecting unit 5.

In the above-described embodiments, the present invention is applied to the image forming device equipped with the scanner function and the printer function. However, the present invention can be applied not only to the above embodiments but also to image forming devices equipped with at least the printer function. Moreover, the present invention is also applicable to information processing devices, such as personal computers.

As described in the foregoing, according to the image forming device of the present invention, only when it is determined that the irregular message has not been transmitted within the preset period prior to the timing of the regular message transmission, the regular information dispatch judgment unit allows the regular information transmitting unit to transmit the regular message to the central management equipment. Hence, the image forming device of the present invention is effective in avoiding the frequent transmission of messages to the central management equipment, and this allows the central management equipment to perform efficient maintenance of the image forming device.

The present invention is not limited to the above-described embodiments, and variations and modifications may be made without departing from the scope of the present invention.

Further, the present invention is based on Japanese priority application No. 2001-96562, filed on Mar. 29, 2001, the entire contents of which are hereby incorporated by reference.

What is claimed is:

1. An image forming device equipped with a communication unit connecting the image forming device to a central management equipment via a communication line to allow the central management equipment to remotely perform maintenance of the image forming device, the image forming device comprising:

a first transmitting unit configured to periodically transmit a regular message, indicating a state information of the device, to the management equipment by connecting the device to the management equipment via the communication line when a timing of dispatch of the regular message is detected;

a second transmitting unit configured to transmit an irregular message, indicating a malfunction information of the device, to the management equipment by connecting the device to the management equipment via the communication line when a malfunction in the device is detected;

a transmission judgment unit configured to determine, immediately before the regular message transmission is started, whether the irregular message has been transmitted within a preset period prior to a timing of the regular message transmission, based on a stored newest malfunction information, the transmission judgment unit configured to allow the first transmitting unit to transmit the regular message only when it is determined that the irregular message has not been transmitted within the preset period;

a preset period changing unit configured to change the preset period of the transmission judgment unit to an arbitrarily selected period in response to a preset period changing command.

2. The image forming device according to claim 1, wherein the first transmitting unit is configured to transmit the regular message to the management equipment when a predetermined date and time of regular message transmission is reached.

3. The image forming device according to claim 1, wherein the first transmitting unit is configured to transmit the regular message to the management equipment when a total number of copy sheets used exceeds a predetermined number.

4. The image forming device according to claim 1, wherein the first transmitting unit is configured to transmit the regular message to the management equipment when a period of use of the image forming device exceeds a predetermined period.

5. The image forming device according to claim 1, further comprising:

a control operation inhibiting unit configured to cancel, when a control operation inhibiting command is inputted, the judgment operation of the transmission judgment unit as to whether the regular message transmission is allowed.

6. The image forming device according to claim 1, wherein the transmission judgment unit is configured to inhibit the transmission of the regular message by the first transmitting unit when it is determined that the irregular message has been transmitted within the preset period.

7. The image forming device according to claim 1, further comprising:
a dispatch detecting unit configured to detect the timing of dispatch of the regular message depending on whether a predetermined date and time of regular message transmission is reached.

8. The image forming device according to claim 1, further comprising:
a dispatch detecting unit configured to detect the timing of dispatch of the regular message depending on whether a total number of copy sheets used by the image forming device exceeds a predetermined number.

9. The image forming device according to claim 1, further comprising:
a dispatch detecting unit configured to detect the timing of dispatch of the regular message depending on whether a period of use of the image forming device exceeds a predetermined period.

10. An image forming device equipped with a communication unit which connects the image forming device to a central management equipment via a communication line in order to allow the central management equipment to remotely perform maintenance of the image forming device, the image forming device comprising:
a first transmitting unit configured to periodically transmit a regular message, indicating a state information of the device, to the management equipment by connecting the device to the management equipment via the communication line when a timing of dispatch of the regular message is detected;

a second transmitting unit configured to transmit an irregular message, indicating a malfunction information of the device, to the management equipment by connecting the device to the management equipment via the communication line when a malfunction in the device is detected;

a transmission judgment unit configured to determine, immediately before the regular message transmission is started, whether the irregular message has been transmitted within a preset period prior to a timing of the regular message transmission, based on a stored newest malfunction information, the transmission judgment unit configured to allow the first transmitting unit to transmit the regular message only when it is determined that the irregular message has not been transmitted within the preset period; and a malfunction information memory configured to store the newest malfunction information received from the second transmitting unit as a result of the irregular message transmission, wherein the transmission judgment unit is configured to read the newest malfunction information from said memory before the determination is performed.

11. The image forming device according to claim 10, wherein the transmission judgment unit is configured to inhibit the transmission of the regular message by the first transmitting unit when it is determined that the irregular message has been transmitted within the preset period.

* * * * *